United States Patent [19]

Holdsworth et al.

[11] Patent Number: 4,988,467

[45] Date of Patent: Jan. 29, 1991

[54] METHOD OF FORMING HOT MELT GASKETS

[75] Inventors: Robert S. Holdsworth, Arlington; Shawn E. Brown, N. Cambridge; Joel A. Gribens, Framingham, all of Mass.

[73] Assignee: W. R. Grace & Co.-Conn., Lexington, Mass.

[21] Appl. No.: 357,930

[22] Filed: May 30, 1989

Related U.S. Application Data

[62] Division of Ser. No. 160,628, Feb. 26, 1988, Pat. No. 4,852,754.

[51] Int. Cl.$^5$ .............................................. B29C 13/02
[52] U.S. Cl. .................. 264/46.6; 264/255; 264/268
[58] Field of Search ............ 264/46.6, 255, 268; 425/809; 156/262

[56] References Cited

U.S. PATENT DOCUMENTS

| | | | |
|---|---|---|---|
| 3,061,130 | 10/1962 | Husum | 215/347 |
| 3,493,453 | 2/1970 | Ceresa et al. | 264/268 |
| 3,564,602 | 2/1971 | Peck | 156/262 |
| 3,581,690 | 6/1971 | Zapata | 113/80 |
| 3,637,103 | 1/1972 | Ptak | 215/347 |
| 3,917,100 | 11/1975 | Dukess | 215/329 |
| 4,085,186 | 4/1978 | Rainer | 264/322 |
| 4,151,924 | 5/1979 | Jameson | 215/347 |
| 4,261,475 | 4/1981 | Baboil | 215/341 |
| 4,274,822 | 6/1981 | Tamai et al. | 264/46.6 |
| 4,280,864 | 7/1981 | Bromberg | 264/268 |
| 4,295,573 | 10/1981 | Terry | 215/348 |
| 4,304,744 | 12/1981 | Stroud | 264/268 |
| 4,555,436 | 11/1985 | Geurtsen | 428/200 |
| 4,618,640 | 10/1986 | Tsuchida | 524/272 |
| 4,629,658 | 12/1986 | Lucas | 428/520 |
| 4,671,987 | 6/1987 | Knott et al. | 428/517 X |
| 4,719,153 | 1/1988 | Akasawa et al. | 428/520 X |
| 4,778,699 | 10/1988 | Knox, III et al. | 428/520 X |

Primary Examiner—David A. Simmons
Assistant Examiner—Allan R. Kuhns
Attorney, Agent, or Firm—John Dana Hubbard; William L. Baker

[57] ABSTRACT

A hot melt gasket of two superimposed layers. The first layer contains a large amount of tackifier resin to ensure good adhesion to the closure surface. The second layer contains little or no tackifier resin to ensure a good seal between the closure and container. The hot melt gasket is particularly well suited for use on plastic closures, especially polyolefin closures and more especially polypropylene closures.

10 Claims, No Drawings

METHOD OF FORMING HOT MELT GASKETS

This is a division, of application Ser. No. 160,628, filed Feb. 26, 1988 now U.S. Pat. No. 4,852,754.

This invention relates to hot melt gaskets and more particularly to novel hot melt gaskets having improved adhesion properties and sealing properties, especially to plastic closures.

BACKGROUND OF THE INVENTION

Hot melt gaskets are solid at room temperature and molten at elevated temperatures (generally 250° F. to 450° F.). Hot melt gaskets have been used in closures, in particular plastic closures. Hot melt gaskets have several advantages over other gaskets such as solvent based gaskets, water based gaskets and plastisols. Hot melt gaskets are solvent free, do not require fluxing, heating or drying after application, are easy to apply and set up quickly. In view of these advantages, hot melt gaskets have obtained some acceptance in the container industry.

Generally, hot melt gaskets have been based upon thermoplastic block copolymers or ethylene vinyl acetate copolymers (EVA) or mixtures thereof. EVA copolymers are preferred due to cost, thermal stability and flexibility.

Present hot melt gaskets however have several drawbacks. In particular, hot melt gaskets are notorious for their poor adhesion to plastic closures formed from polypropylene. Part of the problem is the limited amount of tackifier resin which can to a hot melt gasket without degrading its sealing properties. Specifically, tackifier resins adversely effect the durometer of the hot melt gasket, increasing the durometer or hardness of the gasket thereby reducing its ability to seal. Additionally, tackifier resins have been shown to increase the removal torque of the applied closures, making them difficult or impossible to remove and therefore commercially unacceptable. This presents a serious problem to the widespread use of hot melt gaskets in the container industry as polypropylene is the preferred closure material.

To overcome this problem, various mechanical interlocking or hold fast devices have been incorporated into plastic closures to retain the hot melt gaskets. These devices include ribs, undercuts and retaining lips, recesses and hollows and raised obtrusions. All of these devices are designed to trap and hold the hot melt gasket in place. While generally successful, they require a reworking of the closure mold and often interfere with the removal of the closure from the mold. These problems have been countered with the use of multipiece molds or subsequent formation of the devices after molding or slowing down the molding process to allow for the proper removal of the closures. In doing so, however, the cost of molding these closures has risen dramatically. Further, these devices are not always suitable in a closure. They can interfere with the lining of the hot melt gasket and interfere with the application of the closure to the container. Lastly, these devices do not always ensure that the gasket will be retained, especially in screwed-on closures where the resistance between the gasket and the container surface upon application and removal can dislodge the gasket from these devices. The present invention provides a hot melt gasket and method of applying the same that overcomes these problems of adhesion and sealing.

SUMMARY AND OBJECTS OF THE INVENTION

The present invention provides a hot melt gasket and method of applying such a gasket that has superior adhesion properties, especially to polypropylene without sacrificing the sealing abilities of the closure. The present invention provides a two-layered gasket with a lower layer containing a large amount of tackifier resin and an upper layer that is essentially free of tackifier resin and which provides an adequate seal between the closure and the container. The present invention provides a method of forming such a gasket by lining the two layers sequentially each at about 25% to 75% of the total film volume of the hot melt gasket.

An object of the present invention is to provide a hot melt gasket comprising a lower layer of thermoplastic hot melt material containing a tackifier resin and an upper layer applied to the upper surface of the lower layer, wherein the upper layer is formed of a thermoplastic hot melt material which is essentially free of tackifier resin.

A further object is to provide a hot melt gasket formed by the process of lining a first hot melt layer into a closure, the first layer comprised of a thermoplastic hot melt material containing a tackifier resin; lining a second hot melt layer onto the first hot melt layer, the second layer being comprised of a thermoplastic hot melt material being essentially free of a tackifier resin; and cooling the two layers.

Another object is to provide a two layered hot melt gasket with superior adhesion to plastic closures, especially polypropylene, wherein the two layers are formed of the same hot melt base polymer and the first layer contains a tackifier resin in an amount sufficient to cause the layer to adhere to a plastic closure and the second layer is essentially free of a tackifier resin and adhered to the first layer.

A further object is to provide a two layered hot melt gasket having superior adhesion to plastic closures, especially polyolefin closures, wherein the two layers are formed of different, but compatible, base polymers and the first layer contains a tackifier resin in an amount sufficient to cause the layer to adhere to a plastic closure and the second layer is essentially free of a tackifier resin and adhered to the first layer.

These and other objects and features of the present invention will be pointed out in the specification and appended claims.

DESCRIPTION OF THE INVENTION

The present invention is a two layered hot melt gasket having excellent adhesion properties to plastic surfaces without a loss in sealing abilities or reasonable removal torques.

The hot melt gasket of the present invention comprises a first layer containing a tackifier resin in an amount sufficient to cause the first layer to bond securely to the closure's surface. The second layer contains little or no tackifier resin and is applied on top of the first layer.

The first layer acts as an adhesion layer binding the hot melt gasket to the surface of the closure. To do so, the first layer contains an amount of tackifier resin that is sufficient to form a good bond between the first layer and the closure surface. The second layer which is applied over and bonded to the first layer acts as the sealing layer. It contains little or no tackifier resin and is therefore softer and more flexible than the first adhesion layer. By combining the two layers, each with its own desired properties, which properties if formed throughout the entire gasket would be unacceptable, one can obtain a hot melt gasket with superior adhesion to the closure and adequate sealing properties.

The present invention allows one to dispose of the retaining devices commonly used in plastic closures. However, the present invention can be used with those devices if so desired, either to provide additional security or to avoid the cost of retooling.

The first layer of the present invention is comprised of a conventional hot melt base polymer such as ethylene vinyl acetate copolymers (EVA), a thermoplastic block copolymer, such as styrene-isoprene-styrene (SIS) block copolymers, styrene-butadiene-styrene (SBS) block copolymers, styrene-ethylene butadiene-styrene block copolymers (SEBS) or mixtures of the above.

Such base polymers are well known and easily obtainable. An example of a suitable EVA copolymer is known by the trademark, ELVAX, available from E. I. DuPont de Nemours and Company Inc. These materials are ethylene vinyl acetate copolymers and acid terpolymers. Other equally useful copolymers are available from U.S. Industries Chemical Company and sold under the tradenames of ULTRATHENE or VYNATHENE.

The selected EVA copolymer should have a vinyl acetate content of from about 4% to about 30%, more preferably from about 10 to 20%, more preferably about 18%. EVA copolymers with vinyl acetate contents above about 30% exhibit poor adhesion properties, especially on polypropylene. These high content EVA copolymers can be used in the present invention, however, the amount of tackifier resin may have to be increased which may not be acceptable for other reasons.

Additionally, the EVA copolymer selected should have a melt index of from about 250 to 750 dg/min. A preferred melt index is about 500 dg/min.

Examples of block copolymers are available from Phillips Petroleum Company under the tradename of SOLPRENE, or from Shell Chemical Company under the tradename KRATON.

The amount of base polymer used in the first layer should range from about 30 to about 90 parts by weight per 100 parts of first layer. Preferably, the base polymer is from about 50 to 80 parts by weight and more preferably about 75 parts by weight.

The first layer also contains one or more tackifier resins.

Tackifier resins useful in the present invention can be any of the resins known to be useful in hot melt materials. Generally, ester gums, especially rosin esters are useful in the present invention. For example, methyl rosin esters are useful tackifying resins in the present invention. More preferably, various terpene resins such as polyalphapinene and polybetapinene, d-limonene and polypentadiene are useful as tackifying resins in the present invention. Various styrenes such as a low molecular weight polystyrene or a low molecular weight alpha methylstyrene are also useful as a tackifier.

The amount of tackifying resin used in the adhesion layer of the hot melt gasket is not particularly limiting, but can be selected from a wide range so long as it provides the required adhesion of the layer to the closure surface. Generally for purposes of the present invention from about 10 to about 300 parts by weight of tackifying resin per 100 parts by weight of base polymer in the first layer is useful in the present invention.

Additional conventional additives may be added to the first layer as required or desired. For example, an antioxidant may be added in an amount from about 0.05 to 5 parts by weight. If desired, a viscosity reducing agent and/or wax may also be added in amount of from about 1 to about 100 parts by weight.

The second layer of the hot melt gasket may be formed of the same base polymer as the first layer, though other base polymers may be used so long as they are compatible with and form a secure bond between the two layers. The second layer contains little or no tackifier resin, preferably, the second layer is essentially free of tackifier resin, though a small amount may be used to ensure a good bonding between the two layers.

If the base polymer of the second layer is an ethylene vinyl acetate copolymer, then one may use an EVA copolymer having the same melt index as that of the EVA copolymer in the first layer. However, the EVA copolymer of the second layer may have a melt index of from about 7 to 750 dg/min., preferably about 500 dg/min.

Likewise, if an EVA copolymer is used to form the second layer, it may have a wider vinyl acetate content range than the first layer as it is not concerned with the problem of adhesion to the closure surface. A suitable EVA copolymer should have a vinyl acetate content of from about 4% to about 42%, more preferably from about 20% to about 40%.

If desired, a blend of two or more base polymers may be used in the second layer, especially if such a blend would provide better sealing properties to the second layer. The selection of the blend of base polymers should be made so as to ensure for compatibility between the base polymers of the second layer as well as with the base polymer of the first layer. The amount of two or more polymers should be such as to ensure that one polymer makes up at least 50% of the blend. An example of a suitable blend is to use two different ethylene vinyl acetate copolymers such as 40 parts of a first EVA copolymer having a 40% vinyl acetate content and 10 parts of a second EVA copolymer having a vinyl acetate content of 28%.

Additionally, conventional additives for hot melt gaskets may be added. Preferably, an antioxidant in amount of from about 0.05 to 5 parts by weight may be added, suitable antioxidants include but are not limited to high molecular weight polyphenols, such as IRGANOX 1010, sold by Ciba-Geigy Corporation.

Likewise, a viscosity reducing agent and/or wax may be added in amounts of from about 1 to about 100 parts by weight. Suitable agents and/or waxes include but are not limited to paraffin oils and waxes, polyethylene waxes, low density polyethylene, silicone oils, ester waxes and amide waxes.

Additionally, other conventional hot melt additives such as fillers or pigments may be added in amounts ranging from about 0.5 to 100 parts per 100 parts of base polymer. Well known and conventional fillers include silica and talc. Conventional pigments include carbon black and titanium dioxide.

As the second layer does not contain a significant amount of tackifier resin, it will generally be softer and more flexible from the first layer and will provide an adequate seal between the closure and the container.

The two layered hot melt gasket of the present invention can be formed by several methods.

A preferred method is by melting the first adhesion layer material in a hot melt applicator connected to a first lining nozzle and melting the second sealing layer material in a second storage tank of the applicator which is connected to a second lining nozzle. The closure is held by a rotating chuck and is aligned with the two lining nozzles so that the first lining nozzle is first in the direction of rotation of the closure. The first lining nozzle is opened to apply the adhesion layer on to the inner surface of the closure. The second lining nozzle is subsequently opened so as to apply the sealing layer on top of the adhesion layer causing the two layers to bond to each other and form the hot melt gasket. The completed gasket is then allowed to cool.

The sealing layer can be applied to the adhesion layer while the adhesion layer is still molten, though it is equally useful to apply the sealing layer to the adhesion layer which has partially or totally cooled and solidified.

Variations on the above method can also be used. Rather than the use of two nozzles on the same machine one could use two separate, single station lining machines, the first applying the adhesion layer and the second applying the sealing layer. Or if desired, one could form a nozzle which would apply both layers simultaneously into the closure.

Another process which may be used would be to apply a molten blob of the adhesion layer into the center of the closure and applying a die to the layer to form a gasket. The process could then be repeated with the sealing layer being molded onto the adhesion layer and having the desired gasket configuration.

Additionally, if desired one can foam either or both layers, though it is preferred to only foam the second layer. Suitable foaming agents include various chemical blowing agents such as azodicarbonamide or gaseous blowing agents such as air, nitrogen, carbon dioxide or other inert gases. Preferably, a gaseous agent is used and is whipped, dispersed or put into solution with the molten hot melt gasket layers before them are applied to the closure. As example of such gaseous agents and a method of incorporating them into a hot melt material as described in U.S. Pat. No.4,295,573.

Regardless of the method used, it is understood that the resultant gasket should not have a film weight greater than that normally used in such a closure. To do so, one should reduce the amount of each layer applied. Preferably, the two layers are each applied at one half the total film weight of the gasket. However, one could, if desired, vary the amounts of each layer used to obtain optimum gasket performance. For example, if one desires a stronger adhesion to the closure the adhesion layer could be increased to 75% of the total gasket with the sealing layer making up the remainder. Or if a thicker sealing layer is desired, one could vary the respective layers so that the sealing layer makes up a greater amount of the total gasket.

In general, the adhesion layer may make up from about 25% to about 75% of the hot melt gasket of the present invention. Likewise, the sealing layer may make up from about 75% to about 25% of the hot melt gasket of the present invention.

The present invention will be further understood and explained from the following example which should not be construed as limiting in any sense. All amounts of ingredients, unless otherwise indicated, are quoted in parts by weight.

EXAMPLE

A first layer was formed of 50 parts of a ethylene vinyl acetate copolymer having a 28% vinyl acetate content, 10 parts of a tackifier resin, polypentadiene, 5 parts of a wax and 0.5% of an antioxidant. The second layer was formed of 40 parts of an ethylene vinyl acetate copolymer, having a 40% vinyl acetate content, 10 parts of the EVA copolymer used in the first layer, 30 parts of a microcrystalline wax, BOWAX 425, sold by Boler Petroleum Co., 10 parts of a white mineral oil, KADOL U.S.P., sold by the Sonneborn Division of Whitco Chemical, 0.5 parts of an antioxidant, IR-GANOX 1010, sold by Ciba-Geigy Corporation, 1 part each of a silicone oil, DOW CORNING 200 FLUID, sold by Dow Corning Corporation, an erucylamide, ADOGEN 58, sold by Sherex Chemical Co., a high molecular weight aliphatic amine, ARMID 0, available from Armour Industrial Chemical Co., and 1.25 parts of a titanium dioxide dispersion.

The first layer and second layer were melted in a hot melt applicator in separate chambers. The first layer was applied into a 63 mm polypropylene closure around the outer periphery of the inner surface at a film volume of 50% of the total gasket film volume. While still molten, the second layer was applied on top of the first layer at a film volume of 50% of the total gasket film volume. Both layers were allowed to cool.

The caps were turned down onto containers at 30 inch pounds of torque and held at 37° C. for four days. Upon the removal, the gaskets were found to have good adhesion to the closure, had an acceptable removal torque of 25 inch pounds and had provided a satisfactory seal.

The present invention can be used with a wide variety of closures such as bottle caps, larger container closures or pail or drum lids and covers. Preferably, the present invention is used on plastic closures, more preferably polyolefin closures and most preferably polypropylene closures, though the invention can be used on metal crowns, closures and lids as well.

While this invention has been described with reference to its preferred embodiments, other embodiments can achieve the same results. Variations and modifications of the present invention will be obvious to those skilled in the art and it is intended to cover in the appended claims all such modifications and equivalents as fall within the spirit and scope of this invention.

What we claim is:

1. A process forming a hot melt gasket in a polyolefin plastic closure comprising the steps of:
   (a) heating a hot melt ethylene vinyl acetate based compound containing a tackifier resin to a temperature above its melting point and lining the compound onto an inner peripheral surface of the plastic closure, and
   (b) heating a second hot melt ethylene vinyl acetate based compound containing no tackifier resin to a temperature above its melting point and lining the compound onto the first hot melt compound, and
   (c) allowing the first and second hot melt compounds to cool.

2. The process of claim 1 wherein the second hot melt compound is applied to the first hot melt compound while the first hot melt is still molten.

3. The process of claim 1 wherein the first hot melt compound is applied in an amount from about 25% to 75% of the total film volume of the gasket and the second hot melt compound is applied in an amount from about 75% to about 25% of the total film volume of the gasket.

4. The process of claim 1 wherein the first hot melt compound is applied in an amount of about 50% of the total film volume of the gasket and the second hot melt compound is applied in an amount of about 50% of the total film volume of the gasket.

5. The process of claim 1 wherein the tackifier resin of the first hot melt compound is selected from the group consisting of rosin esters, ester gums, terpenes and polypentadiene.

6. A process for forming a hot melt gasket in a plastic closure comprising the steps of:
   a. forming a first hot melt material comprising from about 30 to about 100 parts by weight of a base polymer selected from the group consisting of ethylene vinyl acetate copolymers, styrene-isoprene-styrene block copolymers, styrene-butadiene-styrene block copolymers, styrene-ethylene propylene-styrene block copolymers and mixtures thereof; from about 10 to about 300 parts by weight per 100 parts of base polymer of a tackifier resin selected from the group consisting of ester gums, rosin esters, terpenes, and pentadienes; and from about 0.5 to about 5 parts of an antioxidant;
   b. forming a second hot melt material comprising from about 70 to about 100 parts by weight of a base polymer selected from the group consisting of ethylene vinyl acetate copolymers, styrene-isoprene-styrene block copolymers, styrene-butadiene-styrene block copolymers, styrene-ethylene propylene-styrene block copolymers and mixtures thereof; from about 5 to about 100 parts by weight per 100 parts of base polymer of a viscosity reducing agent and from about 0.5 to about 5 parts by weight per 100 parts of base polymer of an antioxidant;
   c. heating the first hot melt material above its melting point and maintaining the material in a molten state;
   d. heating the second hot melt material above its melting point and maintaining the material in a molten state;
   e. lining the first hot melt material into an inner peripheral portion of a plastic closure to form a first gasket layer;
   f. lining the second hot melt material into the inner peripheral portion of the plastic closure and on top of the first hot melt material to form a second gasket layer; and
   g. allowing the first and second hot melt materials to cool.

7. The process of claim 6 wherein the first and second hot melt materials are applied to the closure at about 50% of the total film volume of the hot melt gasket.

8. The process of claim 6 wherein the first gasket layer is from about 25% to 75% of the total film volume of the gasket and the second gasket layer is from about 75% to about 25% of the total film volume of the gasket.

9. The process of claim 6 wherein the base polymer of the first hot melt material is an ethylene vinyl acetate copolymer having a vinyl acetate content of from about 4% to about 30% and a melt index of from about 250 to about 750 dg/min; and the base polymer of the second hot melt material is an ethylene vinyl acetate copolymer having a vinyl acetate content of from about 4% to about 42% and a melt index of from about 7 to about 750 dg/min.

10. The process of claim 6 further comprising the incorporation of a foaming agent into the second hot melt material during its molten state, causing the agent to foam while the second hot melt material is in its molten state and applying the foamed molten hot melt onto the first hot melt material.

* * * * *